(12) United States Patent
Felchner et al.

(10) Patent No.: US 9,709,100 B2
(45) Date of Patent: Jul. 18, 2017

(54) SERRATION HAVING AN OFFSET CONSTRUCTION POINT

(71) Applicant: NEAPCO EUROPE GMBH, Dueren (DE)

(72) Inventors: Christian Felchner, Wuppertal (DE); Luis Hoeks, Eschweiler (DE); Wolfgang Jackels, Niederkruchten (DE)

(73) Assignee: NEAPCO EUROPE GMBH, Dueren (DE)

(*) Notice: Subject to any disclaimer, the term of this patent is extended or adjusted under 35 U.S.C. 154(b) by 282 days.

(21) Appl. No.: 14/407,175

(22) PCT Filed: Jul. 16, 2013

(86) PCT No.: PCT/EP2013/064968
§ 371 (c)(1),
(2) Date: Dec. 11, 2014

(87) PCT Pub. No.: WO2014/012916
PCT Pub. Date: Jan. 23, 2014

(65) Prior Publication Data
US 2015/0132051 A1    May 14, 2015

(30) Foreign Application Priority Data
Jul. 17, 2012   (DE) .................. 10 2012 106 440

(51) Int. Cl.
*F16D 1/00*   (2006.01)
*F16D 1/033*  (2006.01)
*F16D 1/076*  (2006.01)

(52) U.S. Cl.
CPC ............. *F16D 1/033* (2013.01); *F16D 1/076* (2013.01); *Y10T 403/7045* (2015.01)

(58) Field of Classification Search
CPC ........ F16D 1/033; F16D 1/076; F16D 7/0406; F16D 2001/103; Y10T 403/7045;
(Continued)

(56) References Cited

U.S. PATENT DOCUMENTS 3,557,574 A    1/1971   Avery
5,051,071 A *  9/1991   Haentjens ............. F04D 13/021
                                              415/124.2
(Continued)

FOREIGN PATENT DOCUMENTS

CH    237460 A   8/1945
DE    440816 C   2/1927
(Continued)

OTHER PUBLICATIONS

International Search Report issued Oct. 15, 2013 re: Application No. PCT/EP2013/064968; citing: DE 10 2008 047296 A1 and US 3 557 574 A.

*Primary Examiner* — Jonathan Masinick
(74) *Attorney, Agent, or Firm* — Cantor Colburn LLP

(57) ABSTRACT

A component that is to be mounted so as to be rotatable about an axis of rotation and transmits torque along with a rotating partner includes a first serration that extends about the axis of rotation and is to mesh with the rotating partner which has an adequate second serration mating with the first serration. The first serration has a plurality of teeth which have tooth tips extending substantially in the direction of the axis of rotation and tooth valleys located between the tooth tips. The tooth tips of the first serration each have a meshing edge forming a first line, while the tooth valleys located between the teeth each define a second line. At least two adjacent second lines intersect at an imaginary point lying
(Continued)

between the axis of rotation and the maximum circumference of the first serration, in the semicircular surface beyond the axis of rotation.

16 Claims, 4 Drawing Sheets

(58) Field of Classification Search
CPC .............. Y10T 403/64; Y10T 403/642; Y10T 403/645; Y10T 403/648
See application file for complete search history.

(56) References Cited

U.S. PATENT DOCUMENTS

| | | | | |
|---|---|---|---|---|
| 5,051,075 | A * | 9/1991 | Young | F01C 17/06 418/55.3 |
| 5,149,255 | A * | 9/1992 | Young | F01C 17/06 418/55.3 |
| 9,004,215 | B2 * | 4/2015 | Hofmann | B60B 27/065 180/260 |
| 9,309,926 | B2 * | 4/2016 | Schuermann | F16D 1/033 |
| 2011/0123264 | A1 * | 5/2011 | Wang | F16D 1/033 403/359.6 |

FOREIGN PATENT DOCUMENTS

| | | | | |
|---|---|---|---|---|
| DE | 3636243 | A1 | 5/1988 | |
| DE | 4138917 | A1 | 11/1992 | |
| DE | 19751855 | C1 | 4/1999 | |
| DE | 102005009938 | A1 * | 9/2006 | ......... B60B 27/0005 |
| DE | 102005016427 | A1 * | 10/2006 | ......... B60B 27/0005 |
| DE | 102005054283 | B4 | 5/2007 | |
| DE | 102008009938 | A1 | 9/2009 | |
| DE | 102008030496 | A1 * | 12/2009 | ............. F16D 1/076 |
| DE | 102008047296 | A1 | 4/2010 | |
| DE | WO 2012028459 | A1 * | 3/2012 | ......... B60B 27/0005 |
| DE | 102013217753 | B3 * | 12/2014 | ............. F16D 1/076 |
| GB | 837200 | A * | 6/1960 | ............. F16D 1/033 |
| JP | DE 4234984 | A1 * | 4/1993 | ............. F16D 1/033 |
| JP | EP 2422994 | A1 * | 2/2012 | ......... B60B 27/0036 |
| JP | EP 2708376 | A1 * | 3/2014 | ............... F16D 3/18 |

* cited by examiner

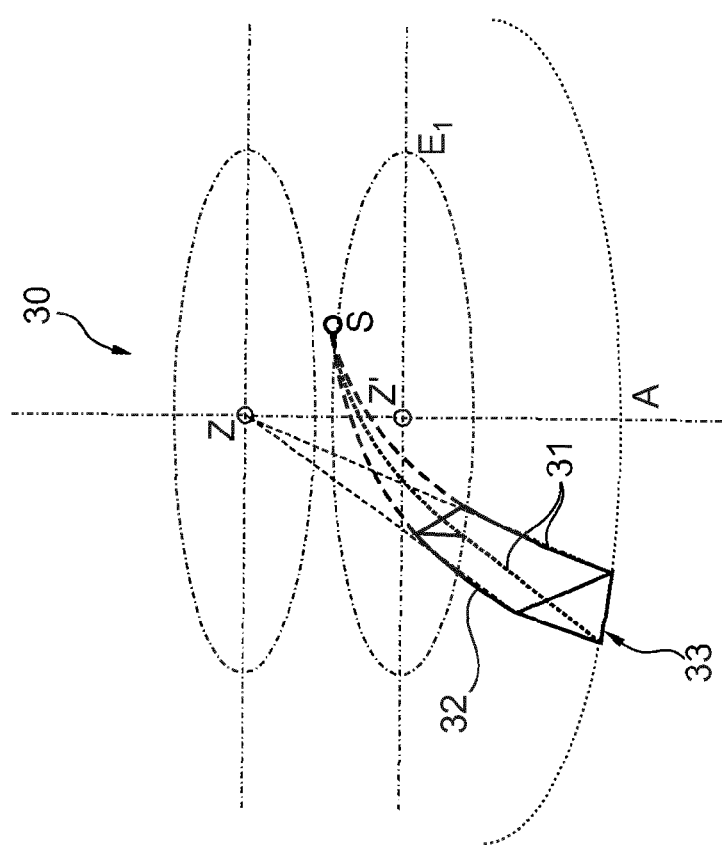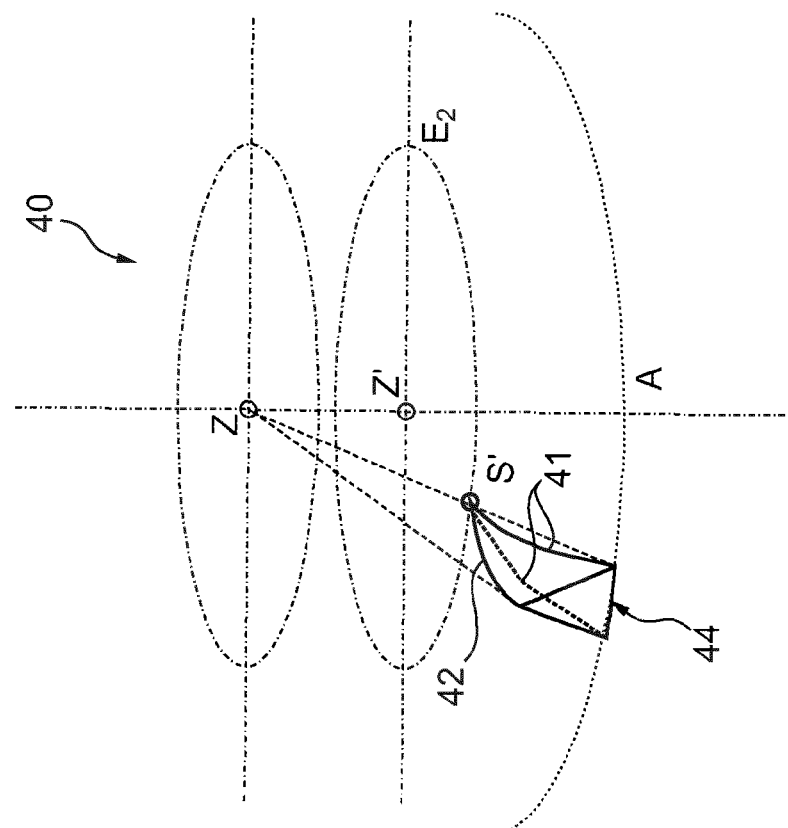
Fig. 4
Fig. 5

SERRATION HAVING AN OFFSET CONSTRUCTION POINT

FIELD

The disclosure relates to a component provided for a rotating mounting about an axis of rotation, in particular as a part of a wheel hub/rotary joint assembly, the component having, for the purpose of transmitting torque, a spur toothing that extends around the axis of rotation and is provided for the biased meshing with a rotating partner having a corresponding spur toothing. In order to support the torque, the spur toothing has several teeth with tooth tips extending substantially in the direction of the axis of rotation, for example radially, and tooth troughs situated therebetween.

BACKGROUND

Providing mating spur toothings in wheel hub/rotary joint assemblies is known; for example, a wheel hub/rotary joint assembly is disclosed in DE 197 51 855 C1 in which the outer joint portion is configured to be disc-shaped. An annular body, which, on the one hand, is connected to the outer joint portion by means of a spur toothing and, on the other hand, is non-rotatably connected to the wheel hub by means of a longitudinal toothing, is provided for torque transmission on to the wheel hub. The outer joint portion and the annular body are axially attached to each other by means of a retaining ring. With respect to the wheel hub, the annular body is axially attached by forming a sleeve-shaped portion of the wheel hub, with the wheel bearing being axially biased by the annular body.

A wheel hub/rotary joint assembly using a spur toothing, in which the wheel hub has a sleeve portion with a bead that axially fixes a bearing inner ring of the wheel bearing, is also known from DE 36 36 243 A1. On its end, the bead has a spur toothing that meshes with a corresponding equal and opposite spur toothing on the outer joint portion for torque transmission. The two spur toothings lie in a common radial plane.

Usually, when designing the teeth, a constructional design commonly known as Hirth-type toothing is used. This toothing was invented by Dr. Albert Hirth and patented by DE 440 816. This Hirth-type toothing is characterized in that the teeth of the spur toothing each have one meshing edge forming a first straight line and tooth troughs, which correspond to the teeth when meshing, each form a second straight line, with the straight lines intersecting on the axis of rotation in one point.

DE 10 2005 054 283 B4 also employs the above-described Hirth-type toothing on the components of the wheel hub/rotary joint assembly. Here, a radially outer part of the teeth of the toothings participating in the meshing are to run ahead in the axial direction, which means that, in the case of an axial screw connection of the two toothings, they first contact each other radially on the outside, and the teeth completely mesh with each other only after the attachment screw has been fully tightened. This is achieved by the point of intersection of the above-described straight line of the one toothing and the point of intersection of the counter-toothing not coinciding, but by both points of intersection being situated offset to each other on the axis of rotation. This approach is disadvantageous in that the degree of meshing in the radially inner area greatly depends on how strongly the two toothings are biased against each other so that a local overload in the inner area cannot be avoided. After several tests, a design of a toothing has proven to have particularly surprising load-bearing capacity, in which the point of intersection of the above-mentioned meshing edge line and the tooth trough line of a tooth is precisely not situated on the axis of rotation, but, according to the disclosure, offset to it.

SUMMARY

Against this background, there is a need for an improved meshing, compared to the common Hirth-type toothing, between two rotating partners that mesh in an interacting manner by means of mating spur toothings. The description, in particular in connection with the figures, additionally characterizes and specifies the disclosure.

The disclosure relates to a component for the rotating mounting about an axis of rotation. The component serves, at least among other things, for the torque transmission with a rotating partner. The component has a first spur toothing that extends around the axis of rotation and is provided for meshing, preferably for biased meshing, with the rotating partner having a corresponding second spur toothing mating with the first spur toothing. The first spur toothing has several teeth with tooth tips extending substantially in the direction of the axis of rotation and tooth troughs situated therebetween. Preferably, a toothing extending around the axis of rotation is provided.

In the radial direction, a tooth of the toothing may, for example, extend from the axis of rotation to the respective outer circumference over the entire radius. Preferably, it is provided that the tooth does not extend up to the axis of rotation, but over a part of the radius from an inner circumference to an outer circumference, that is, the toothing is, for example, configured in an annular manner in order thus to provide space for a centrally disposed means for clamping the component and the rotating partner together. According to the disclosure, the first toothing may also comprise several circumferentially spaced-apart groups of teeth that mate with the second toothing of the rotating partner when meshing. The first spur toothing has one meshing edge, respectively, which forms a first line, hereinafter also referred to as tip line. I.e., the line is respectively defined by the axially outermost points of the toothing on the tooth tips. The tooth troughs situated between the teeth each form a second line, i.e., the axially lowermost points of the toothing define the second line, hereinafter also referred to as root line. The profile of the tooth surface between the first and the second line, respectively, defines the tooth flank. The inclination of the tooth flank to a perpendicular that intersects the first line and is parallel to the axis of rotation may expediently be arbitrary. The flanks of a tooth may, for example, be inclined symmetrically and asymmetrically. Preferably, it is provided that the maximum flank angle with respect to the above-mentioned perpendicular is 19.5°, with a processing-related bilateral tolerance deviation of maximally 0.5°. In addition, the tooth tips and/or tooth troughs can be rounded.

According to the disclosure, at least two adjacent second lines intersect in an imaginary point that lies in the respective semi-circular surface beyond the axis of rotation between the axis of rotation and the maximum circumference of the first spur toothing. The fact that the imaginary point lies not on, but rather outside, the axis of rotation results in the tapering of the tooth in the radial direction becoming less pronounced in the solution according to the disclosure as compared to a tooth which, at least imaginarily, runs towards the axis of rotation. A higher material thickness in the radially inner area is obtained by this measure, as compared with the Hirth-type toothing. Through tests, it was found, surprisingly, that, in the case of a clearance-free biased meshing for example with a conventional Hirth-type toothing, an improved non-rotatable meshing of the toothing can be achieved without an increased risk of a tooth fracture. In order to maintain or even increase the penetration depth of the mating toothings in the radially inner area, the first lines of a tooth run, for example, parallel to the adjacent second lines or even diverge in the direction of the axis of rotation.

According to the disclosure, the first spur toothing can be configured as a helical toothing, i.e. the first lines do not intersect the axis of rotation in such an embodiment. Preferably, however, it is provided that the first lines intersect the axis of rotation, thus resulting in a substantially radial orientation of the teeth, because processing-related tolerance deviations have to be tolerated.

In order to simplify the design, it is provided that the first line, which is situated between two second lines, also intersects the imaginary point.

Preferably, the first lines define a plane. According to another embodiment, it is provided that the first lines lie on the jacket surface of a cone or truncated cone. For example, this is a cone or truncated-cone internal toothing or a cone or truncated-cone external toothing.

"Line" within the sense of the disclosure does not necessarily presuppose a straight extent of the first and second lines. Even if the lines are preferably straight, curved extents of the lines in any direction are also conceivable. Preferably, at least the first lines are curved in a direction parallel to the direction of meshing. In other words, an associated curvature plane is parallel to the axis of rotation, or the axis of rotation is even located within the curvature plane. Preferably, they are curved concavely. Preferably, at least the first line is curved exclusively in the direction parallel to the direction of meshing. I.e. the line is otherwise straight and the sole curvature plane is parallel to the axis of rotation, or the axis of rotation is located within the curvature plane. According to a preferred embodiment, it is provided that the first line retains its direction of curvature over its extent.

For example, the first line does not run from the outer circumference of the toothing in a straight direction towards the imaginary point, which is primarily defined by the second lines, but has a curvature relative thereto in the meshing direction over its radial extent. It was found that the meshing conditions can be better reproduced by a curvature in said direction. For it was found that, particularly in the case of a central clamping, the elastic compliance and its variation in the radial direction depends to a very large extent on the design "basis". This radially varying compliance has to be taken into account when designing the toothing. It was found that this can be accommodated only to an insufficient extent by a straight extent of the construction lines, in particular of the first construction lines. Such a curvature, especially, makes it possible to find a better adaptation to the actual design of the component.

Preferably, the second lines are, furthermore, curved in such a way that the flank angle of the respective tooth is constant over its radial extent. The flank angle, given a cut through the tooth that is respectively perpendicular to the first line and parallel to the axis of rotation, is the angle between a "perpendicular", which is parallel to the axis of rotation, through the first line and the straight line connecting the first and second lines. For example, the curvature of the second lines follows the curvature of the first line. A bulge or crowning in the region of the tooth flanks is to be avoided according to the disclosure. In other words, the cross-sectional geometric conditions of the tooth are to be maintained; only its radial extent has a curvature or rounded portion directed away from the meshing.

It can thus be ensured that despite the curvature, and presupposing a corresponding configuration of the rotating partner, a positive meshing with its spur toothing is obtained in at least some portions.

The disclosure moreover relates to an assembly for torque transmission. The latter comprises a component mounted rotatingly about an axis of rotation and a rotating partner, with the component being configured in one of the above-described embodiments, which are each advantageous. According to the disclosure, the second spur toothing of the rotating partner, which is meshing peripherally, and thus mates, with the first spur toothing, has several teeth with tooth tips, which substantially extend in the direction of the axis of rotation, and tooth troughs situated therebetween, and the tooth tips of the second spur toothing each define a meshing edge forming a third line, and the tooth troughs situated between the teeth each form a fourth line. The toothing of the rotating partner can be configured in any way provided a peripheral meshing with the component can be established. Preferably, a clearance-free, if possible positive, meshing is produced for each tooth at least in some portions, i.e. the tooth forms with its two flanks, at least in some portions, a touching contact with the flanks of the teeth of the respective other spur toothing. According to a preferred embodiment, the second toothing is configured as a Hirth-type toothing, i.e. the third and fourth lines intersect in a point situated on the axis of rotation.

Preferably, it is provided that at least two adjacent fourth lines intersect in an imaginary point that lies in the respective semi-circular surface on this side of the axis of rotation between the axis of rotation and the maximum circumference of the second spur toothing. It is thus accomplished that the tapering of the tooth in the radial direction becomes more pronounced in the solution according to the disclosure as compared to a tooth which, at least imaginarily, runs towards the axis of rotation. A smaller material thickness in the radially inner area is obtained by this measure, as compared with the Hirth-type toothing, whereby space and clearance is created in the interplay between the first and second spur toothings, so that, when clamped, the radially outer region, which is more important for torque transmission due to it being capable of bearing a higher load, may possibly end up first and more strongly in mutual meshing, but the meshing is less exposed to the danger of a local overload in the radially inner area, due to the clearance caused by the tapering. In other words, the clearance between the first and the second spur toothing generally arising, which increases in a radially inward direction, in the case of the intended positive clamping of the two provides for a safety margin in the radially inner area of the teeth, which is more delicate due to the smaller material thickness of the teeth, so that the mating according to the disclosure makes it possible to move in the radial direction from a radially outer, positive meshing to a radially inner, predominantly positive meshing, in order to avoid damage in the inner area.

For an additional improvement in this sense, it is preferred that the third line, which is situated between two fourth lines, also intersects the imaginary point. In this case, it is preferred that the first spur toothing is configured accordingly in this respect: i.e., its first line of a tooth also intersects the point of intersection of the second lines associated with the tooth.

Preferably, the imaginary points of the first spur toothing define a first plane perpendicular to the axis of rotation, and the imaginary points of the second spur toothing define a second plane perpendicular to the axis of rotation, with the planes being spaced-apart parallel to each other also in the case of a biased meshing of the component and the rotating partner. For example, the offset of these planes is accomplished by a curved extent of the above-described construction lines, for example of the first and third lines.

According to a preferred embodiment, it is provided that the imaginary points of the component and the points of the rotating partner are respectively disposed on imaginary circles disposed coaxially about the axis of rotation. Preferably, the circles have the same radius. In one embodiment, the radius corresponds to a radius of a central aperture in the component provided for means for generating a biased meshing between the toothings.

The use in a motor vehicle is preferred, with the assembly being provided between the wheel and a side shaft of a motor vehicle. For example, the one of the spur toothings from the first and second spur toothings is formed on the rolling rivet collar of the wheel bearing and clamped by means of an fastening screw to the counter-toothing, i.e. the respective other one of the first and second spur toothings, which is formed on the joint bell, with the joint bell being a connecting member of the rotary joint that is non-rotatably connected with the side shaft.

BRIEF DESCRIPTION OF THE FIGURES

The disclosure as well as the technical environment are explained in more detail below with reference to the figures. It must be remarked that the Figures depict a particularly preferred embodiment of the disclosure, but that the latter is not limited thereto. The Figures schematically show:

FIG. 4: a perspective top view on to a second embodiment according to the disclosure of the first spur toothing;

FIG. 5: a perspective top view on to a second embodiment according to the disclosure of the second spur toothing;

DETAILED DESCRIPTION OF THE FIGURES

Figure 1:
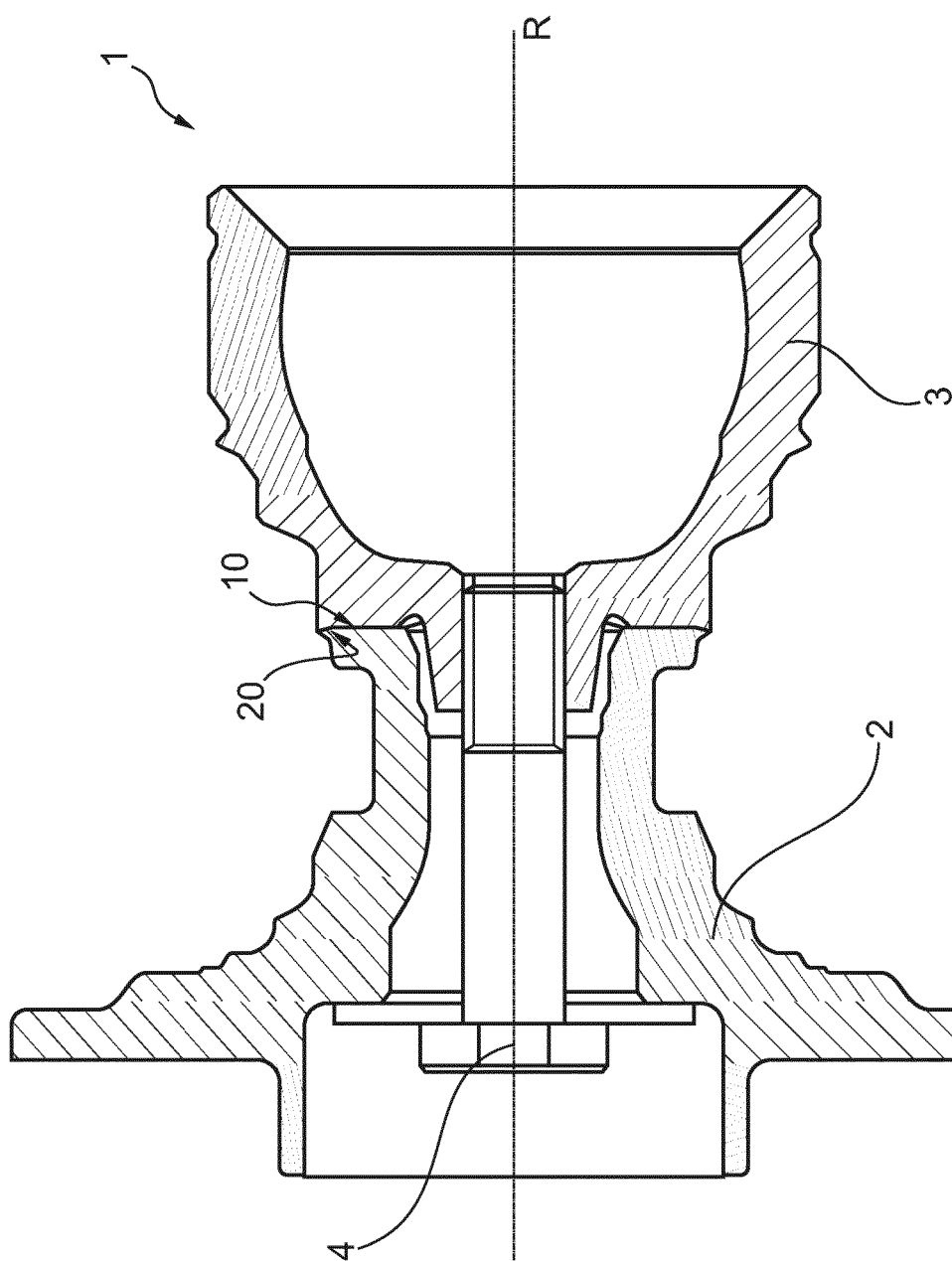
FIG. 1: a partial cross-sectional view of a wheel hub/rotary joint assembly according to the disclosure.
Figure 2:
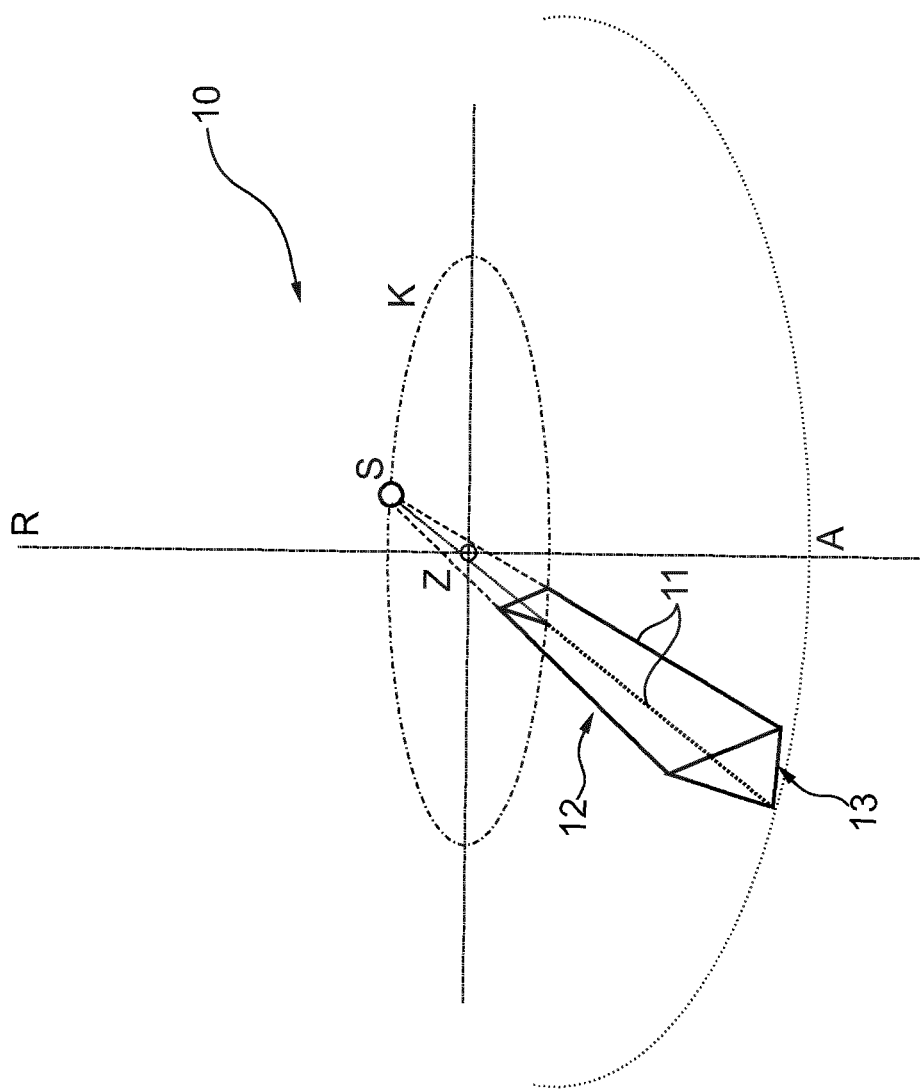
FIG. 2: a perspective top view on to a first embodiment according to the disclosure of the first spur toothing.

FIG. 1 shows a wheel hub/rotary joint assembly 1 according to the disclosure comprising a component 3 according to the disclosure, in this case a joint bell, and a rotating partner 2, in this case a wheel hub. The wheel hub 2 supports a wheel that is not shown. The joint bell 3 is a part of a joint which, driven by a side shaft that is not shown, is made to rotate about the axis of rotation R. In order to couple the component 3 and the rotating partner 2, they are respectively provided with a spur toothing 10 and 20, respectively, extending around the axis of rotation R. They mate with each other so that the teeth of the one mesh with the tooth troughs of the other at least in some portions in a clearance-free, if possible positive, manner. In order to generate a bias with respect to the meshing of the toothings, a central screw connection 4 is provided as an appropriate means. I.e. a screw 4 reaches through a central aperture of the wheel hub 2 and is screwed into a threaded bore of the joint bell 3 and thus clamps the first spur toothing on the side of the joint bell 10 to the second spur toothing 20 on the side of the hub. The constructional design according to the disclosure of the teeth of the spur toothings is explained with reference to the following Figures, wherein the construction lines are respectively supposed to illustrate a schematic representation of a tooth. For example, FIG. 2 shows the construction lines of a tooth 13 of a first embodiment of the first toothing 10 as it is formed, for example, on the joint bell 3 in accordance with the assembly 1 according to the disclosure, which is shown in FIG. 1. As in the following Figures, only one tooth 13 of the first spur toothing is shown. The other teeth, which, however, are each formed with a shape identical to the tooth 13 shown, are disposed so as to run in the circumferential direction about the axis of rotation R along the circle A. The same applies, mutatis mutandis, for the following Figures. The construction line 12 is defined by the meshing edge, i.e. the outermost point of the tooth. The construction lines 11 are each defined by the lowermost points of the tooth troughs adjacent to the tooth. The surface between the tip line 12 to the respective root line 11 defines the flank profile. The associated flank angle is the angle between a plane spanned by the line 12 and the axis of rotation R and the surface respectively spanned by the lines 12 and 11. The construction lines 11, 12 intersect in an imaginary point S, which is situated beyond the axis of rotation R on a circle K, but within the outer circumference A of the first toothing 10. The points of intersection S of all teeth of the first spur toothing 10 are located on the circle K. The point of intersection S is imaginary already because the central aperture in the first toothing 10 for the biasing means 4 is an obstacle to the tooth extending up to the axis of rotation R. According to the disclosure, the imaginary point S in this case does not at all lie on the axis of rotation R, but lies in a semi-circular surface situated beyond the axis of rotation R, between the outer circumference A of the first spur toothing 10 and the axis of rotation R. Thus, the tooth 13 has in the radially inner area a dimension that exceeds that of a common Hirth-type toothing, in which the point of intersection is situated on the axis of rotation R. In an embodiment which is not shown, it is provided that the second spur toothing, which mates with the above-described first toothing and is provided on the wheel hub 2, is configured as a Hirth-type toothing.

Figure 3:
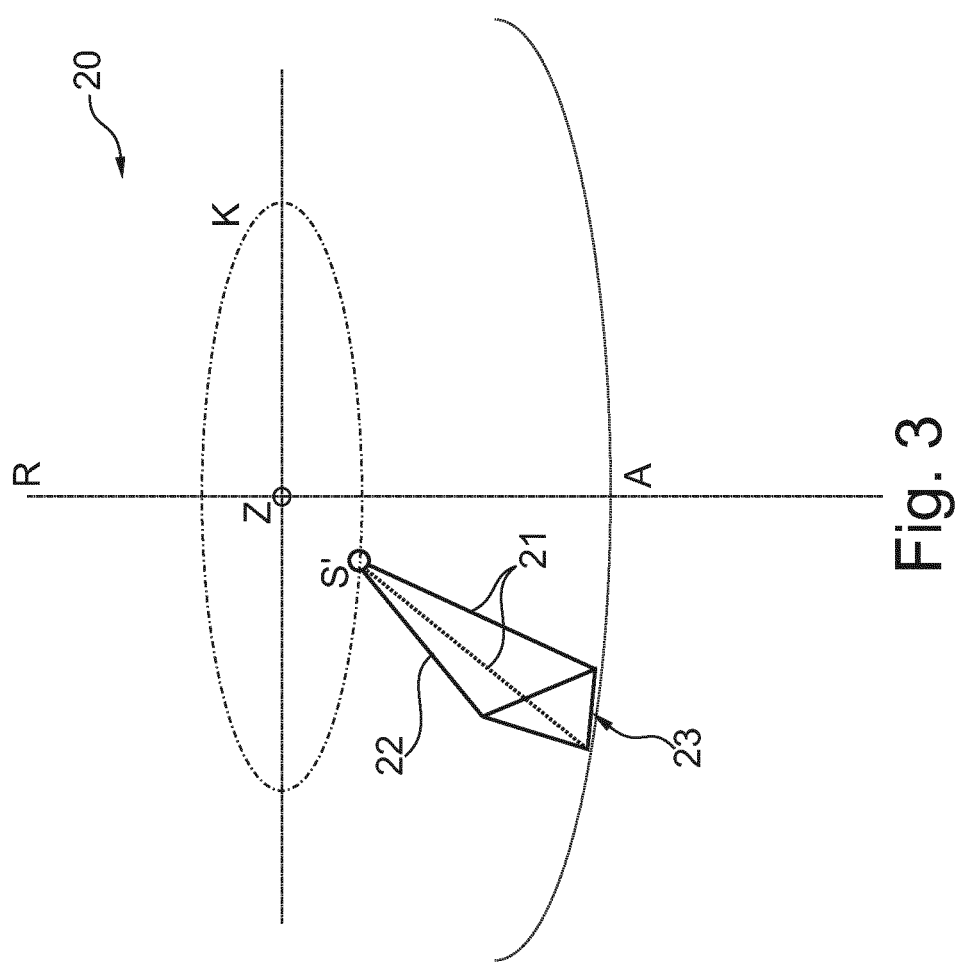
FIG. 3: a perspective top view on to a first embodiment according to the disclosure of the second spur toothing.

However, FIG. 3 shows another embodiment of the second spur toothing 20, which, in accordance with the assembly from FIG. 1, mates with the first spur toothing 10 and is provided at the wheel hub 2, i.e. the rotating partner.

For example, FIG. 3 shows the construction lines of a tooth 23 of a first embodiment of the second toothing 20 according to the disclosure. Only one tooth 23 of the second spur toothing 20 is shown. The other teeth, which, however, are each formed with a shape identical to the tooth 23 shown, are disposed so as to run in the circumferential direction about the axis of rotation R. The construction line 22 is defined by the meshing edge, i.e. the outermost point of the tooth 23. The construction lines 21 are each defined by the lowermost points of the tooth troughs adjacent to the tooth. The surface between the tip line 22 to the respective root line 21 defines the flank profile. The associated flank angle is the angle between a plane spanned by the line 22 and the axis of rotation R and the surface respectively spanned by the lines 22 and 21. The construction lines 22, 21 intersect in an imaginary point S', which is situated on this side of the axis of rotation R on a circle K, but within the outer circumference A of the toothing. The points of intersection S' of all teeth of the second spur toothing 20 are located on the circle K. In this embodiment, the "physical" tooth 23 runs out at the point of intersection S'. According to the disclosure, the imaginary point S' in this case does not at all lie on the axis of rotation R, but lies in a semi-circular surface situated on this side the axis of rotation R, between the outer circumference A and the axis of rotation R. Thus, the tooth 23 has in the radially inner area a dimension that is smaller than that of a common Hirth-type toothing, in which the point of intersection is situated on the axis of rotation R.

FIGS. 4 and 5 each show variations of the first and second spur toothings 30 and 40.

For example, FIG. 4 shows the construction lines of a tooth 33 of a second embodiment of the first toothing 30 as it is formed, for example, on the joint bell 3 in accordance with the assembly 1 according to the disclosure, which is shown in FIG. 1. Only one tooth 33 of this first spur toothing 30 is shown. The other teeth, which, however, are each formed with a shape identical to the tooth 33 shown, are disposed so as to run in the circumferential direction about the axis of rotation R. The construction line 32 is defined by the meshing edge, i.e. the outermost point of the tooth. The construction lines 31 are each defined by the lowermost points of the tooth troughs adjacent to the tooth. The surface between the tip line 32 and the respective root line 31 defines the flank profile. The tip line 32 and the root lines 31 are each curved in a direction parallel to the axis of rotation, in a direction opposite to the meshing direction. The construction lines 32 and 31 intersect in an imaginary point S, which is situated beyond the axis of rotation R on a circle K, but within the outer circumference A of the first toothing 30. The points of intersection S of all teeth of the first spur toothing 30 are located on the circle K. The point of intersection S is imaginary already because the central aperture in the first toothing 30 for the biasing means 4 is an obstacle to the tooth extending up to the axis of rotation R. According to the disclosure, the imaginary point S in this case does not at all lie on the axis of rotation R, but lies in a semi-circular surface situated beyond the axis of rotation R, between the outer circumference A of the first spur toothing 30 and the axis of rotation R, wherein the circle K is in this case spaced from the point of intersection Z, which results in the case of a conventional Hirth-type toothing, in an opposite direction to the meshing direction. Thus, the tooth 33 has in the radially inner area not only a dimension exceeding that of a conventional Hirth-type toothing, but the meshing is reduced in the radially inner area in a non-linear manner and thus better adapted to the radial variation of the elastic compliance of the component, e.g. the joint bell 3. Once again, it is pointed out that this embodiment is also suitable to mate with a conventional Hirth-type toothing, which is provided on the wheel hub 2.

FIG. 5 shows another second embodiment of the second spur toothing 40, which is provided for mating with the above-described embodiment of the first spur toothing 30 and is provided at the wheel hub 2, i.e. the rotating partner.

For example, FIG. 5 shows the construction lines of a tooth 44 of a second embodiment of the second toothing 40 according to the disclosure. Only one tooth 44 of the second spur toothing 40 is shown. The other teeth, which, however, are each formed with a shape identical to the tooth 44 shown, are disposed so as to run in the circumferential direction about the axis of rotation R. The construction line 42 is defined by the meshing edge, i.e. the outermost point of the tooth 44. The construction lines 41 are each defined by the lowermost points of the tooth troughs adjacent to the tooth. The surface between the tip line 42 to the respective root line 41 defines the flank profile. The flank angle is constant over the radial extent of the respective tooth 44. According to the disclosure, the imaginary point S' in this case does not at all lie on the axis of rotation R, but lies in a semi-circular surface situated on this side of the axis of rotation R, between the outer circumference A of the second spur toothing 40 and the axis of rotation R, wherein the circle K is in this case spaced from the point of intersection Z, which results in the case of a conventional Hirth-type toothing, in an opposite direction to the meshing direction. Thus, the tooth 44 has in the radially inner area not only a dimension that is smaller than that of a conventional Hirth-type toothing, but the meshing is reduced in the radially inner area in a non-linear manner and thus better adapted to the radial variation of the elastic compliance of the component, e.g. the wheel hub 2.

The invention claimed is:

1. A component for a rotating mounting about an axis of rotation and for torque transmission with a rotating partner, the component having a first spur toothing that extends around the axis of rotation and is provided for meshing with a rotating partner, which has a corresponding second spur toothing that mates with the first spur toothing, wherein the first spur toothing has several teeth with tooth tips extending substantially in the direction of the axis of rotation and tooth troughs situated therebetween, and the tooth tips of the first spur toothing each have one meshing edge which forms a first line, and the tooth troughs situated between the teeth each form a second line, wherein at least two adjacent second lines intersect in an imaginary point that lies in a semi-circular surface region of the first spur toothing on a distal side of the axis of rotation between the axis of rotation and a maximum circumference of the first spur toothing.

2. The component according to claim 1, wherein the first line, which is situated between two second lines, intersects the axis of rotation.

3. The component according to claim 1, wherein the first line, which is situated between two second lines, intersects the imaginary point.

4. The component according to claim 1, wherein the first lines define a plane.

5. The component according to claim 1, wherein the first lines lie on a jacket surface of a truncated cone.

6. The component according to claim 1, wherein at least the first lines are curved in a direction parallel to the axis of rotation.

7. The component according to claim 6, wherein the second lines are furthermore curved in such a way that a flank angle of the respective tooth is constant over its radial extent.

8. Assembly for torque transmission, comprising a component mounted rotatingly about an axis of rotation, which is configured according to claim 1, and a rotating partner with a second spur toothing, which is meshing peripherally with the first spur toothing, wherein the second spur toothing of the rotating partner has several teeth with tooth tips, which substantially extend in the direction of the axis of rotation, and tooth troughs situated therebetween, and the tooth tips of the second spur toothing each define a meshing edge forming a third line, and the tooth troughs provided between the teeth each form a fourth line.

9. The assembly according to claim 8, wherein at least two adjacent fourth lines intersect in an imaginary point that lies in a semi-circular surface region on a proximal side of the second spur toothing on a distal side of the axis of rotation between the axis of rotation and a maximum circumference of the second spur toothing.

10. The assembly according to claim 9, wherein the third line situated between two fourth lines also intersects the imaginary point.

11. The assembly according to claim 10, wherein the imaginary points of the component and the imaginary points of the rotating partner are respectively disposed on imaginary circles disposed coaxially about the axis of rotation.

12. The assembly according to claim 11, wherein the radius of each of the respective circles is the same.

13. The assembly according to claim 9, wherein the imaginary points of the first spur toothing define a first plane perpendicular to the axis of rotation, and the imaginary points of the second spur toothing define a second plane perpendicular to the axis of rotation, with the planes being spaced-apart parallel to each other.

14. The assembly according to claim 8, wherein means (4) are provided for effecting a biased meshing of the first and second spur toothing.

15. The assembly according to claim 8, wherein the assembly is provided between a wheel and a side shaft of a motor vehicle.

16. The assembly according to claim 1, wherein at least the first lines are curved in a direction opposite to a meshing direction.

* * * * *